(12) United States Patent
Yamamoto

(10) Patent No.: US 6,168,742 B1
(45) Date of Patent: Jan. 2, 2001

(54) METHOD OF INSERT MOLDING AUTO AND TRUCK BUMPER, ROCKER PANEL AND CHIN SPOILER PARTS

(75) Inventor: Hiroaki Yamamoto, Brookville, OH (US)

(73) Assignee: Green Tokai, Co., Ltd., Brookville, OH (US)

( * ) Notice: Under 35 U.S.C. 154(b), the term of this patent shall be extended for 0 days.

(21) Appl. No.: 09/024,502

(22) Filed: Feb. 17, 1998

(51) Int. Cl.$^7$ .................................................. B29C 45/14
(52) U.S. Cl. ...................... 264/266; 264/267; 264/269; 264/275; 425/127; 425/129.1
(58) Field of Search ..................... 264/266, 269, 264/275, 267; 475/127, 129.1

(56) References Cited

U.S. PATENT DOCUMENTS

| | | | |
|---|---|---|---|
| 3,289,253 | 12/1966 | Buonaiuto | 18/47 |
| 3,290,082 | 12/1966 | Fritsch | 293/1 |
| 3,357,056 | 12/1967 | Reyburn | 18/42 |
| 3,359,030 | 12/1967 | Newman | 293/1 |
| 3,388,523 | 6/1968 | Evans | 52/717 |
| 3,444,275 | 5/1969 | Willett | 264/26 |
| 3,451,709 | 6/1969 | Swauger | 293/1 |
| 3,493,257 | 2/1970 | Fitzgerald et al. | 293/71 |
| 3,506,294 | 4/1970 | Newman | 293/1 |
| 3,715,138 | 2/1973 | Finkle | 293/1 |
| 3,843,475 | 10/1974 | Kent | 161/4 |
| 3,897,967 | 8/1975 | Barenyi | 293/1 |
| 3,914,482 | 10/1975 | Sawa et al. | 428/31 |
| 3,959,538 | 5/1976 | Loew | 428/31 |
| 4,015,760 | 4/1977 | Bott | 224/42.1 |
| 4,066,285 | 1/1978 | Hall et al. | 293/62 |
| 4,083,592 | 4/1978 | Rubin et al. | 293/71 R |
| 4,154,893 | 5/1979 | Goldman | 428/375 |
| 4,160,052 | 7/1979 | Krysiak et al. | 428/31 |
| 4,174,986 | 11/1979 | Jennings | 156/160 |
| 4,197,688 | 4/1980 | Mauer | 52/718 |
| 4,216,184 | 8/1980 | Thomas | 264/229 |
| 4,298,324 | 11/1981 | Soulier | 425/174.8 |
| 4,334,700 | 6/1982 | Adell | 280/770 |
| 4,334,706 | 6/1982 | Seki | 293/126 |
| 4,358,482 | 11/1982 | Jubelt | 427/259 |
| 4,364,789 | 12/1982 | Moran | 156/214 |
| 4,401,232 | 8/1983 | Constable et al. | 220/450 |
| 4,408,432 | 10/1983 | Carter et al. | 52/718 |
| 4,414,731 | 11/1983 | Riemer | 29/453 |
| 4,489,019 | 12/1984 | Takeda et al. | 264/26 |
| 4,546,021 | 10/1985 | Mears | 428/31 |
| 4,579,755 | 4/1986 | Takeda et al. | 428/31 |
| 4,587,761 | 5/1986 | Adell | 49/462 |

(List continued on next page.)

OTHER PUBLICATIONS

SAE International®, SAE Technical Paper Series 902231, "Paint Film Laminate Technology Provides Painted Thermoplastic Parts Without VOC Issues," Charles H. Fridley, Nov. 1, 1990.

* cited by examiner

Primary Examiner—Mathieu D. Vargot
Assistant Examiner—Edmund H. Lee
(74) Attorney, Agent, or Firm—Biebel & French

(57) ABSTRACT

A paint film laminate is co-molded over a desired plastic substrate to produce an automobile bumper member, chin spoiler or rocker panel part. Along a desired surface of the part, such as, for example, a border between a part surface having one segment covered by paint film and a second segment comprising the exposed substrate, the edge of the paint film is embedded in the plastic substrate along a surface discontinuity such as a recess or ridge so that an aesthetically pleasing sight edge having a desired contour exists along this surface portion. The sight edge is formed during the co-molding process via the provision of an incline or ramp along a desired mold cavity surface. When the co-molded part is installed in its intended application, the paint film edge is substantially hidden from view by the surface discontinuity.

5 Claims, 5 Drawing Sheets

U.S. PATENT DOCUMENTS

| | | | |
|---|---|---|---|
| 4,587,762 | 5/1986 | Adell | 49/462 |
| 4,597,755 | 7/1986 | Samson et al. | 604/96 |
| 4,613,178 | 9/1986 | Fujita | 293/128 |
| 4,617,209 | 10/1986 | Ives | 428/31 |
| 4,619,847 | 10/1986 | Jackson | 428/31 |
| 4,634,565 * | 1/1987 | Irrgang | 264/510 |
| 4,671,974 | 6/1987 | Murachi | 428/31 |
| 4,710,338 | 12/1987 | Bagnall et al. | 264/509 |
| 4,715,648 | 12/1987 | Hensel | 296/198 |
| 4,719,067 | 1/1988 | Thiel | 264/259 |
| 4,721,642 | 1/1988 | Yoshimi et al. | 428/90 |
| 4,722,818 | 2/1988 | Zoller | 264/171 |
| 4,724,585 | 2/1988 | Whitman | 24/295 |
| 4,726,614 | 2/1988 | Myers et al. | 293/128 |
| 4,734,147 | 3/1988 | Moore | 156/212 |
| 4,767,040 | 8/1988 | Miller et al. | 224/326 |
| 4,778,550 | 10/1988 | Barton et al. | 156/211 |
| 4,786,094 | 11/1988 | Barton et al. | 293/128 |
| 4,797,244 | 1/1989 | Sauer | 264/266 |
| 4,808,450 | 2/1989 | Guy | 428/31 |
| 4,833,741 | 5/1989 | Mizuno et al. | 5/404 |
| 4,906,421 | 3/1990 | Plamthottam et al. | 264/22 |
| 4,940,557 | 7/1990 | Kimura | 264/26 |
| 4,968,474 | 11/1990 | Ito | 264/513 |
| 5,000,902 | 3/1991 | Adams | 264/510 |
| 5,023,033 | 6/1991 | Cakmakci | 264/161 |
| 5,063,014 | 11/1991 | Cakmakci | 264/151 |
| 5,087,488 | 2/1992 | Cakmakci | 428/31 |
| 5,100,728 | 3/1992 | Plamthottam et al. | 428/345 |
| 5,108,681 | 4/1992 | Cakmakci | 264/151 |
| 5,178,708 | 1/1993 | Hara et al. | 156/242 |
| 5,193,711 | 3/1993 | Hirata et al. | 220/453 |
| 5,203,941 | 4/1993 | Spain et al. | 156/209 |
| 5,240,751 | 8/1993 | Cakmakci | 428/31 |
| 5,242,650 | 9/1993 | Rackovan et al. | 264/509 |
| 5,372,491 | 12/1994 | Fritsch et al. | 425/130 |
| 5,599,608 | 2/1997 | Yamamoto et al. | 428/192 |
| 5,746,962 * | 5/1998 | Yamamoto | 264/266 |
| 5,972,279 * | 10/1999 | Harris et al. | 264/513 |

METHOD OF INSERT MOLDING AUTO AND TRUCK BUMPER, ROCKER PANEL AND CHIN SPOILER PARTS

FIELD OF THE INVENTION

The present invention pertains to an improved method of insert molding of a laminated film or the like over a plastic substrate to produce a part such as a bumper, chin spoiler or rocker panel for an automobile or truck.

BACKGROUND OF THE INVENTION

A variety of injection molded parts have been made and used for auto or truck body and trim parts. For example, bumpers, body panels, doors, filler panels, wheel covers, dashboards, arm rests and other parts have been made via injection molding techniques. Additionally, with regard to automobile exteriors, body side moldings, beltline moldings, roof moldings and window moldings are made via injection molding of thermoplastic olefin ("TPO") or acrylonitrile-butadiene-styrene copolymer ("ABS") or from other thermoplastic materials.

In order to provide a painted surface for these parts, film lamination techniques have been successfully employed. In accordance with these processes a paint film laminate is insert molded with the desired thermoplastic to fuse the film over the injection molded part. The resulting injection molded part is ready for assembly without subsequent painting.

The paint film laminate used in these insert molding techniques may comprise a backing sheet of about 0.020" in thickness to which paint layers are adhered. Typically, the backing sheet comprises an extruded thermoplastic sheet.

In such paint film laminates, a paint film, comprising a cast dried continuous paint coating, is provided over the backing sheet. The paint film may consist of a monocoat, a clear coat over a base coat or a clear coat and a base coat with interposed print or design. The paint film, including base coat, clear coat and print or design, if desired, may range from about 0.5–4 mil. in thickness.

The laminated paint films are available, for example, from Avery Dennison, Decorative Films Division, Schererville, Ind., or Rexham Decorative Products, Charlotte, N.C. The films are typically provided in a roll, unwound, then trimmed to a proper "preform" size and shape, ready for insertion into the injection mold. The preform is usually placed along the cavity side of the mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occurs. Injection molds used for these processes are rear or edge gated so that the molten resin is directed along the backside of the film. The process leads to a finished plastic part with the paint film fused over the underlying plastic substrate. The painted or decorative side of the paint film laminate is exposed over the surface of the substrate to exhibit the desired aesthetic appearance.

It has become increasingly popular to insert or co-mold bumper, rocker panel, and chin spoiler parts for autos and trucks. Conventionally employed co-molding techniques however often result in the unsightly disposition of one of the paint film laminate edges over the substrate plastic in such manner that the laminate edge is exposed on the surface of the part and presents an uneven or non-uniform border with the plastic substrate material. This not only detracts from the physical appearance of the edge, but the exposed edge then serves as a site for peeling back and eventual separation of the film laminate from the underlying substrate.

Furthermore, the border between the film laminate and plastic substrate may have a wavy or uneven appearance. This may be caused by non-uniform dimensions or shrinkage of the paint film laminate during molding.

Accordingly, there is a need for a method for co-molding bumper, rocker panel, and chin spoiler parts wherein a uniform border is provided between the film laminate and plastic substrate. There is a more specific need for a method in which the paint film edge is located in a recess or relief area so that it can not be readily peeled back from the underlying substrate. Additionally, there is a need for a manufacturing process that will place the laminate-plastic border on the far or remote side of a raised area of the plastic part so that it will be hidden from sight and not normally seen from the vantage point of an ordinary observer.

SUMMARY OF THE INVENTION

These and other objects of the invention are met by the instant methods and fused film-plastic parts made thereby.

Briefly, improvement in traditional insert molding techniques is provided so as to provide for bumper, chin spoiler or rocker panel-type parts having Class A show surfaces. A specifically configured mold cavity structure is provided to facilitate formation of a uniform sight edge in the paint film laminate adjacent the boundary between the paint film laminate edge portion and the underlying plastic substrate. This results from provision of a surface discontinuity in the mold and corresponding part.

In one form of the invention, this discontinuity comprises a ramped or inclined concave cavity surface portion along a mold cavity surface for which the formation of the uniform sight edge is provided. The film edge is positioned along the ramp, short of the nadir of the concavity. Upon molding, the film edge is positioned in the recessed part portion formed, in the mold, adjacent the concavity.

In a preferred form of the invention, the film laminate edge is positioned over the apex of a convex ramp formed in the mold cavity. Upon molding, the film edge is formed in the part adjacent the convex ramp of the mold cavity. The paint film edge is positioned over the apex of the ramp remote from the viewer's vantage point. In this way, the viewer will see only the film covered ramp side facing him or her.

The invention will be further described in conjunction with the appended drawings and detailed description.

DETAILED DESCRIPTION OF THE INVENTION

Figure 1:
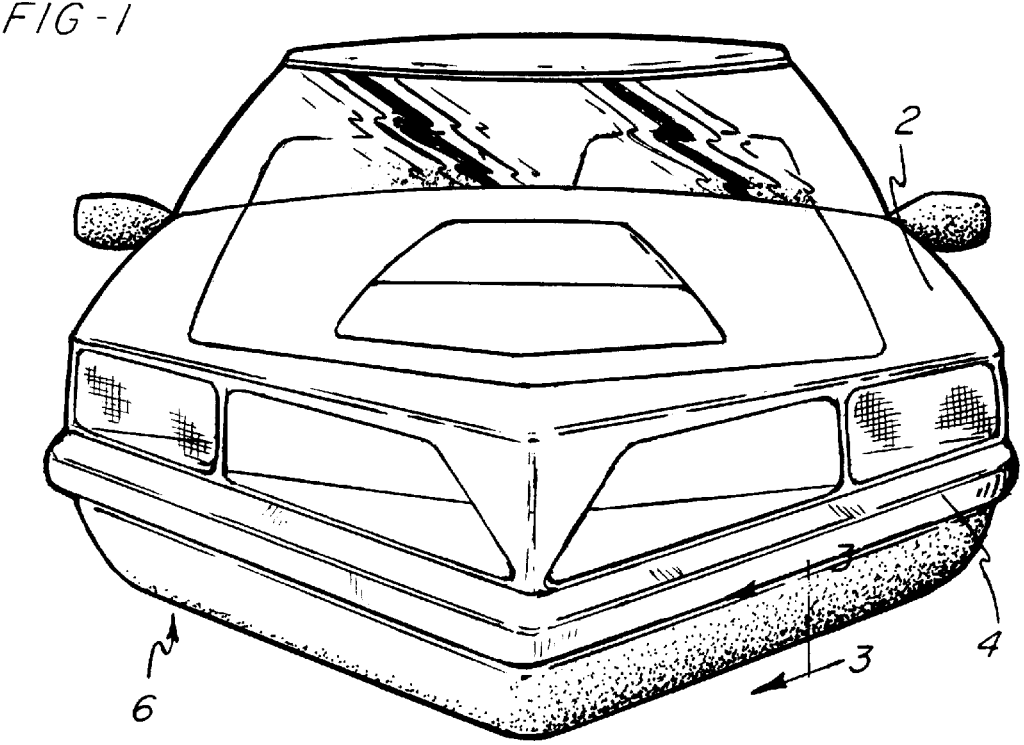
FIG. 1 is a front end elevational view of an automobile having a chin spoiler paint film covered plastic part made in accordance with the invention.

Turning now to FIG. 1, there is shown an automobile 2 having disposed across its front body portion thereof continuous bumper member 4. Continuous with and underneath the bumper member is a chin spoiler 6 made in accordance with the invention. The bumper member 4 and the chin spoiler 6, together, present a continuous surface. Often, such chin spoilers, such as those depicted in FIG. 1, are used to improve the aerodynamic drag of the vehicle and/or to guard against body scratches and dents which could otherwise occur via the action of road debris or the like.

Figure 1A:
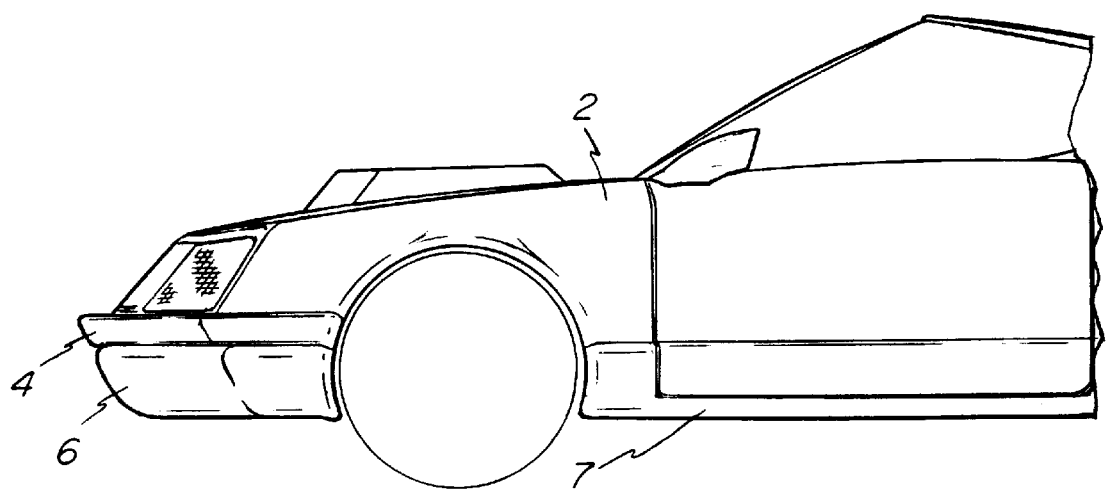
FIG. 1A is a partial side elevational view of an automobile having a rocker panel paint film covered plastic part made in accordance with the invention.

Turning now to FIG. 1A, the same automobile 2 has disposed along its side body portion a rocker panel 7, which basically serves the same purposes as the chin spoiler 6 as well as providing support to passengers entering and leaving a passenger compartment (not shown) of the automobile 2.

Figure 2:
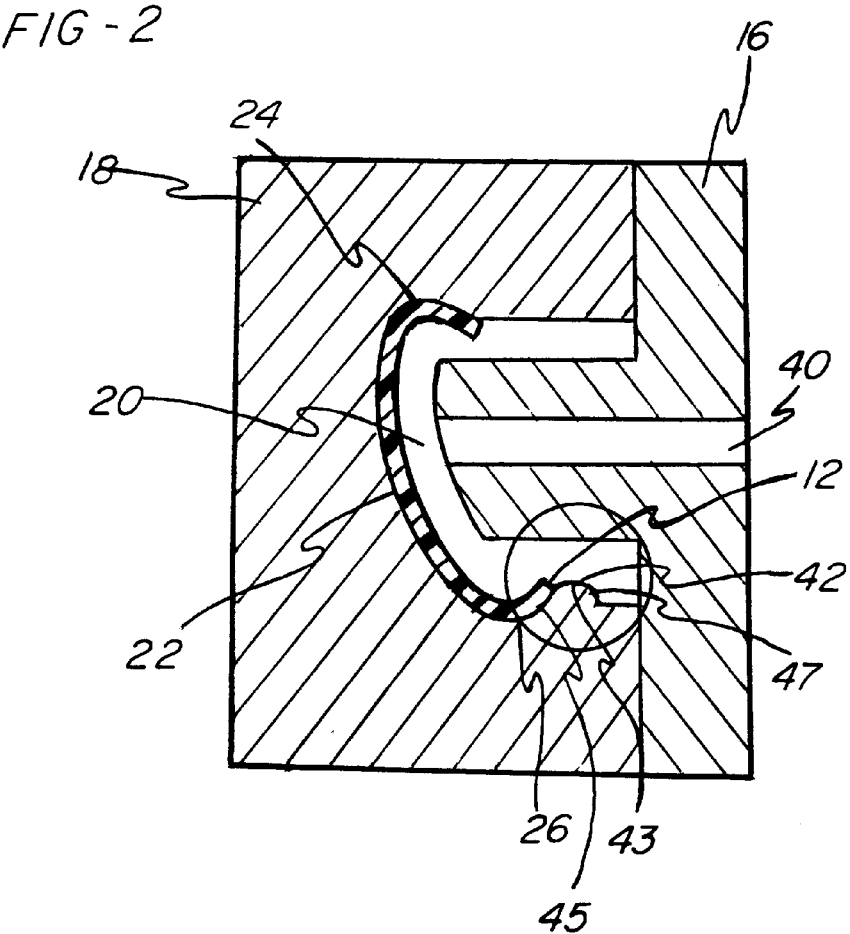
FIG. 2 is a transverse cross-sectional view of a mold cavity utilized to practice the instant invention.
Figure 3:
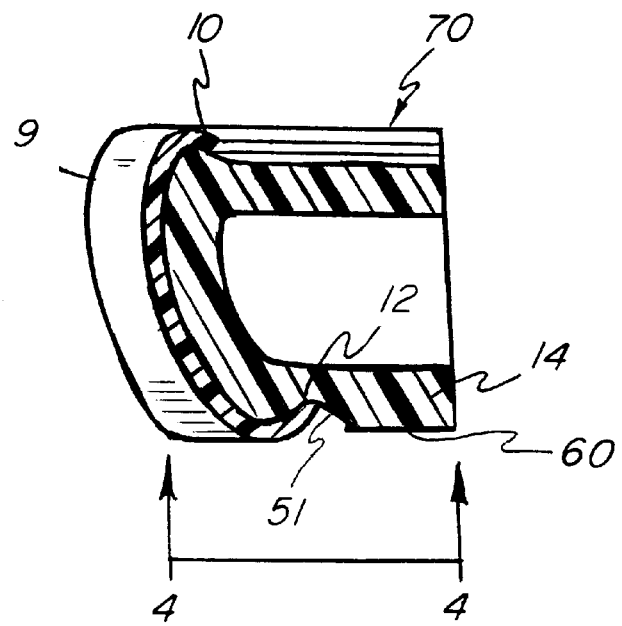
FIG. 3 is a sectional view of the chin spoiler shown in FIG. 1, taken along the lines and arrows 3—3 of FIG. 1.

Turning now to FIG. 3, there is shown a part 8 in accordance with the invention. The part 8, shown in cross-section in FIG. 2, may be either a chin spoiler 6 (FIG. 1) or a rocker panel 7 (FIG. 1A). While not shown in FIG. 3, the part 8 would include mounting structure such as clip houses (not shown) positioned along its length to facilitate mounting of the part 8 on the exterior of the automobile 2.

The part 8 comprises an outer layer composed of a paint film laminate. The paint film laminate comprises a show face front surface 9, a top horizontally disposed edge 10 and a bottom edge 12 parallel to edge 10. The paint film laminate is superposed over and provides a show surface over the plastic substrate 14. In many cases, it is desirable to match colors between the front surface 9 of the paint film and the resin 14.

The entire surface of bottom edge 12 is embedded within the plastic 14 in groove 51 so that this edge is recessed from the bottom surface 60 of the chin spoiler. Accordingly, when viewed from this bottom, an aesthetically pleasing part is shown that does not exhibit an abrupt or unsightly transition between the edge 12 and the bottom surface 60 of the part due to the tucking and ultimate fusing of the surface of edge 12 within the plastic matrix at groove 51. Additionally since the edge 12 is totally recessed and attached to the matrix at this point, the paint film laminate is more securely anchored at this location than in other co-molded parts wherein the edge is merely superposed over but not embedded in the plastic. Accordingly, edge 12 will be less likely to peel back than in ordinary moldings where the boundary between the film edge and the plastic substrate is disposed along a relatively planar contour of the part.

Turning now to FIG. 2, there is shown a male mold member 16 and female mold member 18 which are configured so that they may be used in accordance with the instant process to form the part 8 shown in FIG. 3. Again, with reference to FIG. 2, a cavity 20 is defined between the male and female mold members 16, 18. The cavity comprises a front surface 22, top surface 24 and bottom surface 26. Sprue 40 serves as an entry port for admission of thermoplastic or thermoset resin such as polypropylene or TPO into the cavity 20.

Figure 2A:
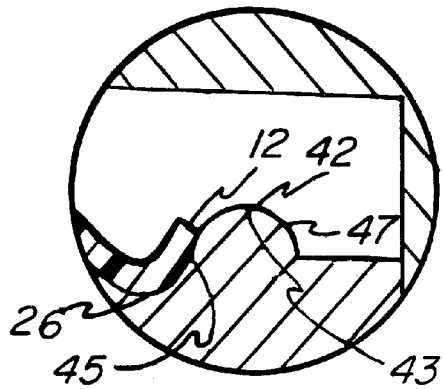
FIG. 2A is a magnified cross-sectional view of the circled area of the mold cavity shown in FIG. 2.

In accordance with the invention, the paint film laminate is positioned in the mold cavity adjacent the front surface 22 of the cavity. The show or decorative side of the paint film laminate is contiguous with the front surface 22 of the mold cavity. As best viewed in FIG. 2A, a convex ramp or incline 42 is provided having an apex 43 and two sloping sides 45, 47 respectively along the bottom surface of the mold cavity 26. Here, the edge 12 of the film is positioned in the mold so that it is positioned along ramp side 45 short of the apex 47. The molten plastic is injected into the mold along the rear side of the paint film laminate. The paint film is thereby pressed into the cavity surface by the action of the molten plastic thereon. At the location of inclined surface 45, a border is provided between the bottom edge 12 of the paint film and the plastic that, during the molding process, will be disposed within the ridge or relief area 51 (see FIG. 3).

Although the provision of one ramp 42 is shown along the bottom side 26 of mold cavity 20, it is to be appreciated that a similar ramp could also be provided along the top side 24 of the mold cavity to provide the desired border between the otherwise free edge of the film laminate and the plastic matrix at this location as well.

After injection of a proper amount of plastic into the mold, the plastic is allowed to set and the mold cavities are separated to thereby result in the formation of the desired plastic part, either a bumper, a chin-spoiler or a rocker panel.

As to the plastic that may be utilized for the injection molding process, thermoplastic resins or thermoset resins may both be mentioned. Additionally, thermoplastic elastomer components may also be used. At present, it is preferred to utilize TPO as the resin component.

In accordance with the above process an insert molded plastic article is provided wherein the film laminate or the like covers the intended face surface of the part and wherein the bottom or top edge of the film laminate and the contiguous plastic surface provide a uniform border area.

Figure 4:
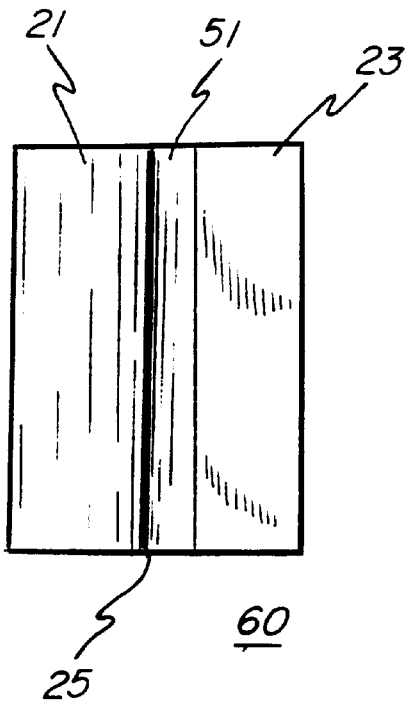
FIG. 4 is a sectional view of the chin spoiler shown in FIG. 1 taken along the lines and arrows 4—4 of FIG. 3.

The invention is therefore broadly directed toward improved methods in which a bi-component surface such as surface 60 may be provided. Turning specifically now to FIG. 4, the surface 60 is substantially smooth and planar and has a first segment 21 that is covered by the paint film laminate and a second segment 23 that includes the exposed substrate. The border 25 between the first and second segments is substantially linear and disposed longitudinally along the length of the part. The border is defined by the upturned portion of the paint film laminate proximate edge 12 (FIG. 3) into the groove 51. The edge 12 is positioned within the groove 51, however.

Figure 5:
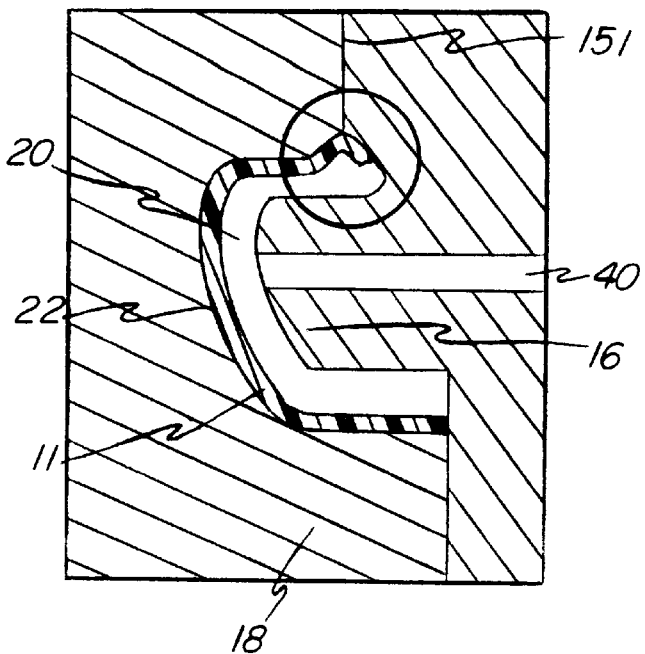
FIG. 5 is a transverse cross-sectional view of a mold cavity utilized to practice a second embodiment of the instant invention.

Turning now to FIG. 5 there is shown another embodiment quite similar to that shown in FIG. 2 save for the provision of a concave ramp formed in the mold along the parting line formed by the male and female mold members 16, 18. This type of ramp and the ensuing method are used to provide a borderline between paint film and contiguous plastic substrate that will be hidden from sight when positioned adjacent to the requisite structural part such as an auto or truck body part.

More specifically, FIG. 5 discloses mold cavity 20 defined between male mold member 16 and female mold member 18. Sprue 40 is provided and functions to provide an entrance way into the cavity 20 for the pressurized molten plastic. Similar to FIG. 2, the paint film laminate 11 is positioned in the mold cavity adjacent the front surface 22 of the cavity. The show or decorative side of the paint film is contiguous with the front surface 22 of the cavity.

Figure 5A:
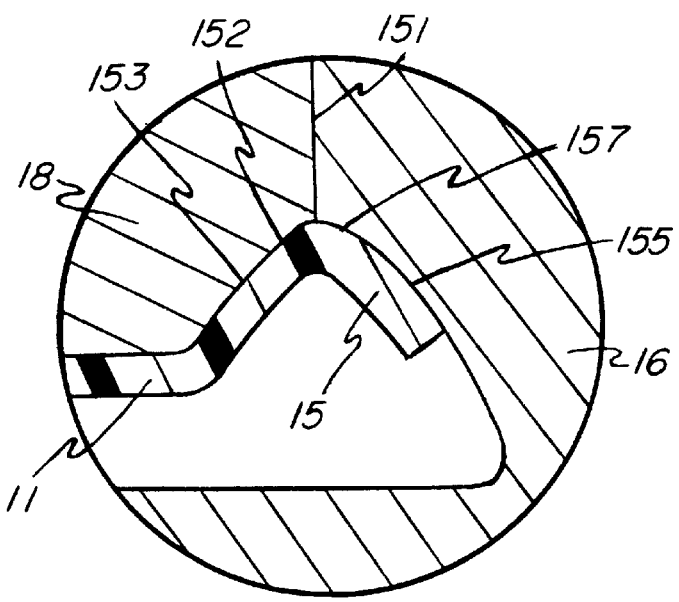
FIG. 5A is a magnified view of the circled area of the mold cavity shown in FIG. 5.

As best shown in FIG. 5A, the paint film laminate 11 comprises a top longitudinal edge 15. A concave ramp 152 is provided on the mold surface between the male mold member and female mold member along part line 151 of the mold. The concave ramp includes upwardly and downwardly sloped surfaces 153, 155 respectively which are acutely angled from vertex 157. Edge 15 of the laminate is positioned in the mold so that it extends past the vertex and terminates along downwardly sloped surface 155. This is important since the part made in this mold cavity 20 (FIG. 5) will be positioned so that the edge 15 will be disposed closely adjacent a frame or body panel so that the viewer will only see the front 8 and top 10 show side of the film without being able to view the edge 15.

Figure 6:
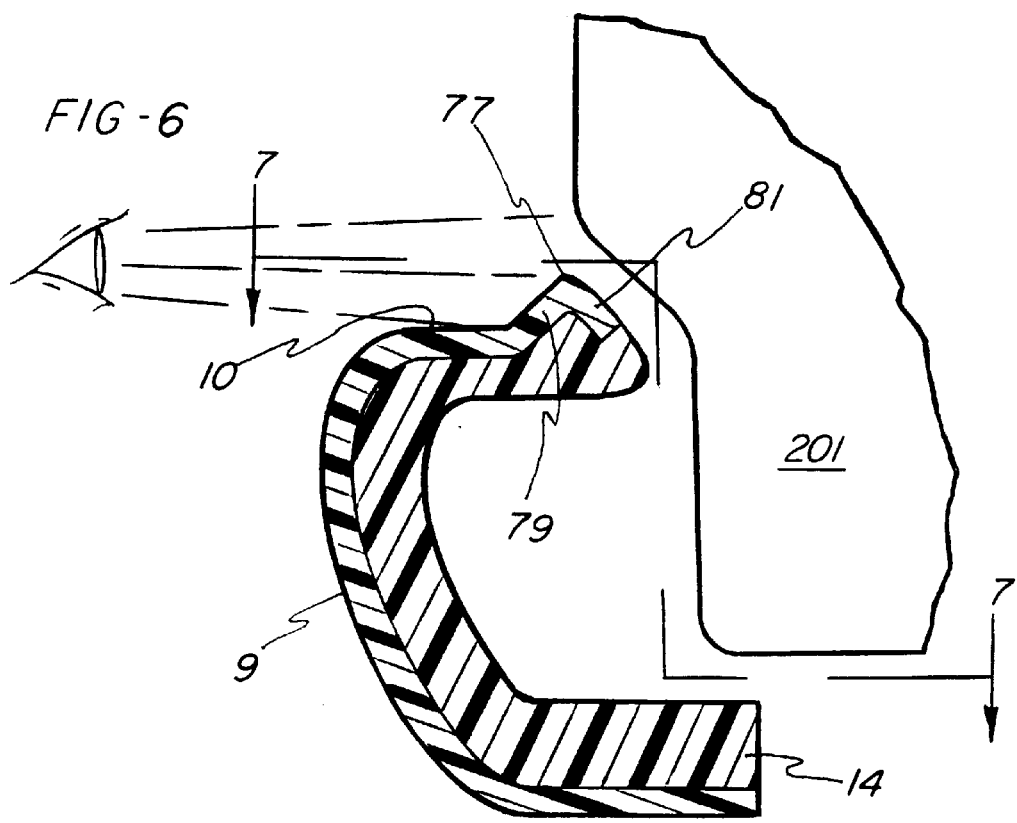
FIG. 6 is a sectional view of a part produced using the mold cavity of FIG. 5 used as a chin spoiler and shown in combination with a car body panel.

Turning now to FIG. 6, there is shown a paint film covered part 70 made in the mold cavity of FIG. 5 for use as a chin spoiler, rocker panel or the like on an automobile or truck. Here, the part comprises show side front 9 and top 10 surfaces with the paint film fused over the plastic substrate 14. The part is positioned closely adjacent body or truck member 201 such that the edge 15 will not be viewed by the observer's eyes. This helps to ensure that the part presents an aesthetically pleasing show surface with regard to all visible surfaces thereof.

Figure 7:
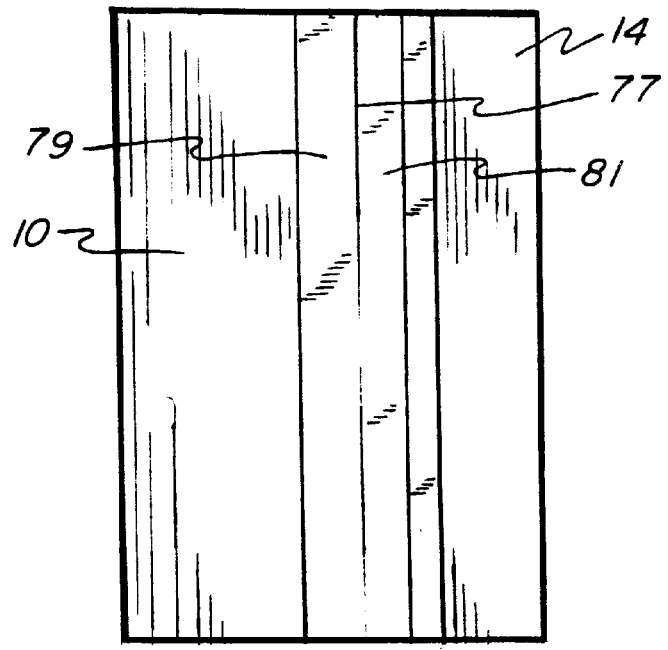
FIG. 7 is a sectional view of the part shown in FIG. 6 taken along the lines and arrows 7—7 of FIG. 6.

Stated differently, and with regard to FIGS. 6 and 7, the part 70 is an elongated film laminate covered plastic part wherein a front show face 9 is provided and a top show surface 10 provided over plastic substrate 14 along the length of the part. The top show surface comprises a longitudinally extending ridge or convexity having apex 77 and upwardly and downwardly sloping surfaces, 79 and 81, respectively. The paint film completely covers the upwardly disposed ridge surface 79 and apex 77 with its longitudinal end 15 thereof terminating along the downwardly sloped surface 81. This downwardly sloped surface 81 is positioned in close spatial proximity to the auto or truck 201.

It is apparent then that film laminate covered parts are made in accordance with the invention wherein a film laminate end forms a longitudinally extending border with the underlying plastic substrate. The border is disposed with a surface irregularity that interrupts the normally smooth contour of the surface.

This surface irregularity may comprise either an elongated recess or ridge like member with the end of the film laminate disposed in the recess or on the ridge spaced downwardly from the apex of the ridge. In either case, the edge is better protected since it is not disposed on the normally smooth contour.

Having described the invention in detail and by reference to preferred embodiments thereof, it will be apparent that modifications and variations are possible without departing from the scope of the invention defined in the appended claims.

What is claimed is:

1. Method of making a part for a motor vehicle, said part selected from the group consisting of a bumper member, a spoiler and a rocker panel, said part having a bi-component surface including a plastic substrate and a paint film laminate overlying a portion of said plastic substrate and having an end forming a border area of said part adjacent said plastic substrate, said method comprising:

(a) providing a mold cavity defining a mold cavity surface portion for forming said bi-component surface, (b) providing a surface discontinuity in said mold cavity surface portion, said discontinuity having a pair of oppositely sloping surfaces and an intermediate region located between and connecting said sloping surfaces, (c) placing said film laminate along said mold cavity surface portion, and positioning said end of said film laminate along one of said sloping surfaces, (d) injecting molten plastic into said mold cavity and along said mold cavity surface portion and said film laminate; and (e) allowing said molten plastic to set thereby forming the part.

2. Method as recited in claim 1 wherein in said step (b) said surface discontinuity comprises an elongated concavity.

3. Method as recited in claim 1 wherein said surface discontinuity comprises an elongated convexity.

4. Method as recited in claim 1 wherein said surface discontinuity is a convexity and said intermediate region is the apex of said convexity.

5. Method as recited in claim 1 wherein said surface discontinuity is a concavity and said intermediate region is the nadir of said concavity.

* * * * *